Jan. 15, 1946. L. M. PERSONS 2,392,943
METHOD OF MAKING THERMOSTATIC ELEMENTS
Filed Dec. 15, 1941 2 Sheets-Sheet 1

INVENTOR:
LAWRENCE M. PERSONS
BY Brainiger and Sutherland
HIS ATTORNEYS.

Jan. 15, 1946. L. M. PERSONS 2,392,943
METHOD OF MAKING THERMOSTATIC ELEMENTS
Filed Dec. 15, 1941 2 Sheets-Sheet 2
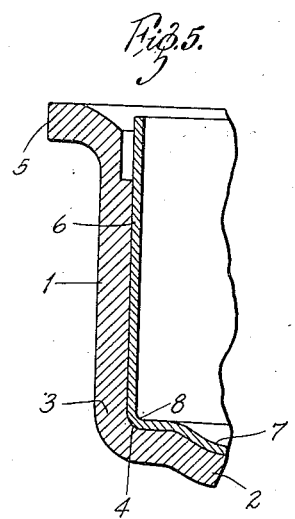
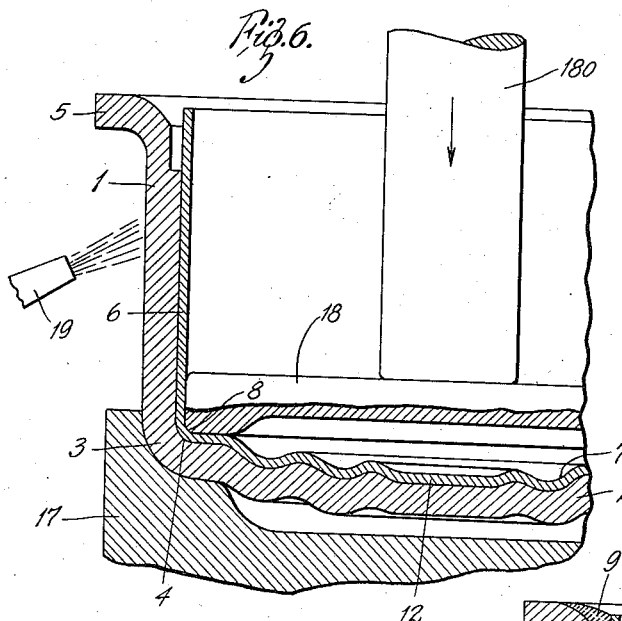
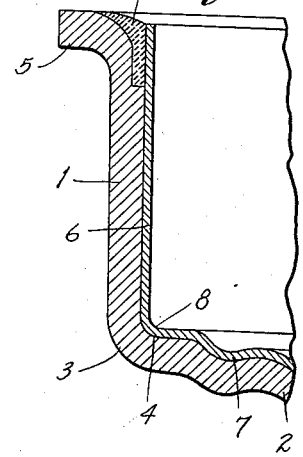
INVENTOR:
LAWRENCE M. PERSONS,
By Bruninga and Sutherland
HIS ATTORNEYS Patented Jan. 15, 1946

2,392,943

UNITED STATES PATENT OFFICE 2,392,943

METHOD OF MAKING THERMOSTATIC ELEMENTS

Lawrence M. Persons, Ladue, Mo., assignor to L. M. Persons Corporation, St. Louis, Mo., a corporation of Missouri Application December 15, 1941, Serial No. 423,050

6 Claims. (Cl. 29—148.2)

This invention pertains to the art of making thermo-sensitive actuating devices and more particularly to the construction of the control actuating element of such a device.

In the application of heat regulating devices to various appliances, it frequently happens that the control element operates under a temperature different from that of the zone whose temperature is being regulated. For example, in the case of domestic ranges, the bulb of the heat regulator may be located in the oven, while that portion of the regulator which controls the gas valve may be located on the exterior of the range, at a substantial distance from the oven. The control element is therefore influenced by variations in the temperature of its immediate environs, and care must be exercised to construct such control elements so that the temperature at which the control element is operating is not reflected in the temperature of the zone which it is desired to control. The temperature at which the control element is operated is commonly known to those skilled in the art as the ambient temperature, while the temperature of the zone which it is desired to control is referred to as the bulb temperature.

It is readily apparent, of course, that when the calibrated dial of a heat control element is set for maintaining a bulb temperature of, for example, 500° F., the amount of expanded fluid which must flow into the control element before the fuel valve is closed must be greater than the amount of fluid which must be expanded into the control element when the dial is set for say 300° F. Expansion of the parts due to ambient temperature, however, affects the relation between expanding thermometer fluid and movement of the fuel valve. Since it is not practical to calibrate the dial so as to compensate for variations in ambient temperature, various attempts have been made to compensate the control elements otherwise.

Heretofore various attempts have been made to produce a self-compensating regulator, and while the compensator heretofore provided has been sufficient for practical purposes in some applications, it has not been characterized by accuracy. This is primarily because the compensation heretofore provided has been fixed according to ambient temperatures, irrespective of bulb temperatures. While with such fixed compensation the results achieved are reasonable approximations of that which is desired, such fixed compensations generally result in over compensation at the lower operating temperatures and under compensation at the higher operating temperatures. Since the volume of expanded fluid in that portion of a heat regulating system which is subject to ambient temperatures is greater when the bulb temperature is high than when the bulb temperature is low, it is evident that any such device whose compensation varies only in accordance with ambient temperature must be characterized by inaccuracy of operation.

The object of the present invention, generally stated, is to provide a method of making a regulator of the character hereinbefore referred to which will properly compensate for expansion.

Another object of the present invention is to provide a method of controlling the amount of compensation in a heat regulator of the character referred to.

Other objects will become apparent to those skilled in the art when the following description is read in connection with the accompanying drawings, in which:

Figures 5, 6, and 7 are fragmentary views similar to Figure 3, illustrating a series of steps involved in making the control unit in accordance with one embodiment of this invention.

Figure 1:
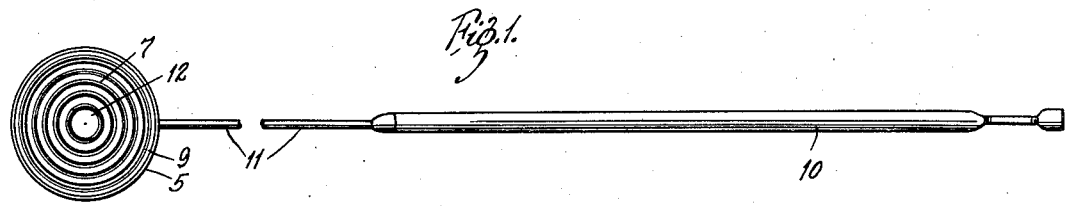
Figure 1 is a face view of a thermostatic unit of the type to which this invention is applied.

In accordance with the present invention, generally stated, a control element may be formed of nested cups, one of which forms the diaphragm, and the other the complementary supporting part. The inside or diaphragm cup is made of a material having a lower coefficient of expansion than the material of which the exterior or supporting cup is made. For example, the diaphragm cup may be formed of seventeen percent chrome steel, while the exterior cup may be formed of brass. When such nested cups are connected together adjacent their mouths, but are free to move relatively in an axial direction elsewhere, any increase in ambient temperature is reflected by an increase in the space between the bottoms of the cups, since the brass expands at a greater rate than the steel. A device so constructed will operate to provide a fixed amount of compensation, according to the ambient temperature; and hence, as pointed out hereinbefore, is suitable for use in those applications where a high degree of accuracy is not required.

In order to render such a device suitable for use in those applications where a high degree of accuracy is required, the diaphragm cup and the supporting cup may be connected together in such manner that the side walls thereof are under initial tension at normal atmospheric temperatures, and for a substantial range of temperatures thereabove. This may be accomplished by connecting such elements together while heated to a high temperature, for instance, 400° to 600° F.; care being exercised that when the connection is made the bottoms of the nested cups are clamped into close engagement. Consequently, when the cups are assembled in this manner and permitted to cool to normal atmospheric temperature, the contraction of the exterior element having the greater co-efficient of expansion, is greater than the contraction of the interior element; so that the side walls of the exterior element are under tension, while the side walls of the interior element are under compression axially.

Such elements may, of course, be connected under such initial tension by any other suitable means than that of heating; as for example, by suitable application of mechanical forces tending to elongate and compress the exterior and interior elements respectively. Again, the nested cups may be connected together cold and mechanically worked, as by the application of a force endwise of the brass cup, tending to compress the side walls thereof.

Within an assembly of nested cups (having different coefficients of expansion) connected adjacent their mouths, increases in ambient temperature tend to effect an increase in the end clearance between the bottoms of the cups. This is because the exterior element expands at a greater rate than the interior or diaphragm element. When, however, the cups are connected so that at low temperatures the side walls thereof are under an initial tension, relative expansion due to increasing ambient temperatures is not reflected as an increase in end clearance until the ambient temperature has risen to such a point that the exterior cup element has expanded sufficiently to relieve itself, as well as the interior or diaphragm cup, of their initial tensions. In the case of nested cups connected together at a high temperature as above suggested, the ambient temperature at which the initial tension would be overcome is approximately the temperature at which the nested cups were connected together. In order to reduce the temperature at which relative expansion of the parts will begin to be reflected as an increase in end clearance, the assembly may be treated so as to partially relieve the initial tension in the parts.

This may be accomplished by any suitable, well-known means of stress relieving, as for example heat treatment, mechanical shock, or mechanical working. In other words, when initially formed, the nested elements may be connected under such initial tensions that relative expansion will not operate to increase the end clearance below the temperature at which they were connected; but if the assembly is annealed, mechanically shocked or worked so as to reduce that initial tension, the temperature at which relative expansion becomes effective to increase end clearance is lowered accordingly, the degree of lowering depending of course upon the degree of stress relieving treatment applied.

Conversely, the application of a compressive force endwise of the exterior cup will effect an elevation of the temperature at which relative expansion of the parts begins to be reflected as increased end clearance.

In the accompanying drawings, control unit comprising nested cups, the exterior one (hereinafter called the cup) being formed of brass, and the interior one (hereinafter called the diaphragm) being formed of seventeen percent chrome steel, the outer supporting cup is illustrated as having a cylindrical wall 1, and a bottom wall 2 which is joined to the wall 1 at the annular bend 3. The diaphragm element has a cylindrical side wall 6 and a bottom 7 which forms the diaphragm disk and which is usually corrugated, as indicated in the drawings. The bottom 2 of the supporting cup may also be corrugated to correspond in shape to the diaphragm disk 7. By thus matching and nesting these parts, the volume of the space between them may be reduced to a minimum.

Figure 2:
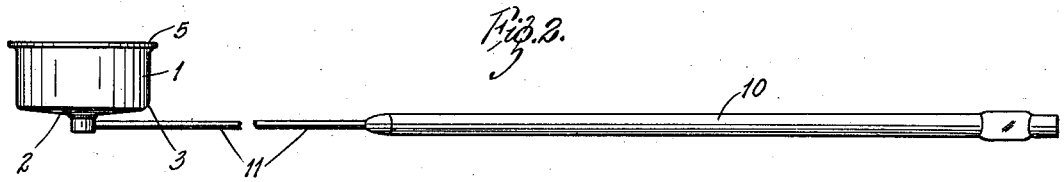
Figure 2 is a side view of Figure 1.
Figure 3:
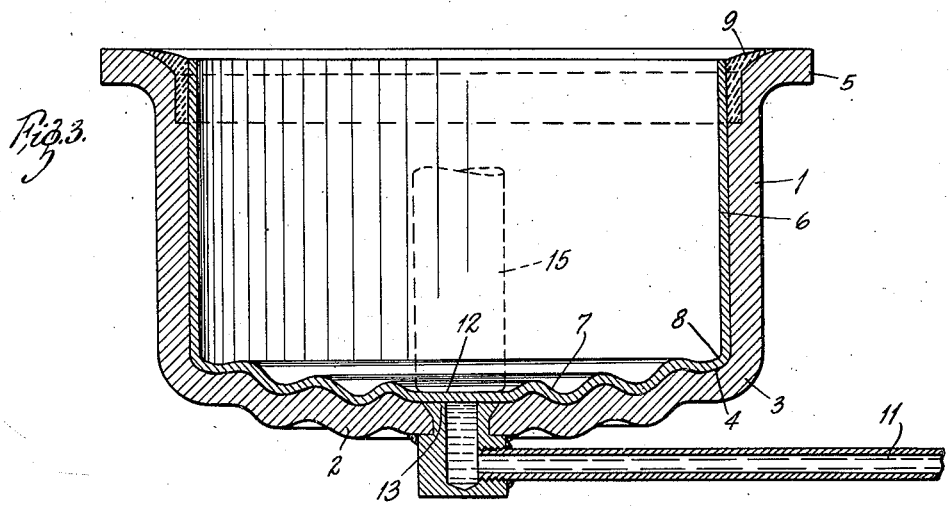
Figure 3 is a central vertical section of the diaphragm unit formed by the supporting cup and the diaphragm element, the position of the parts as shown being at low temperatures.
Figure 4:
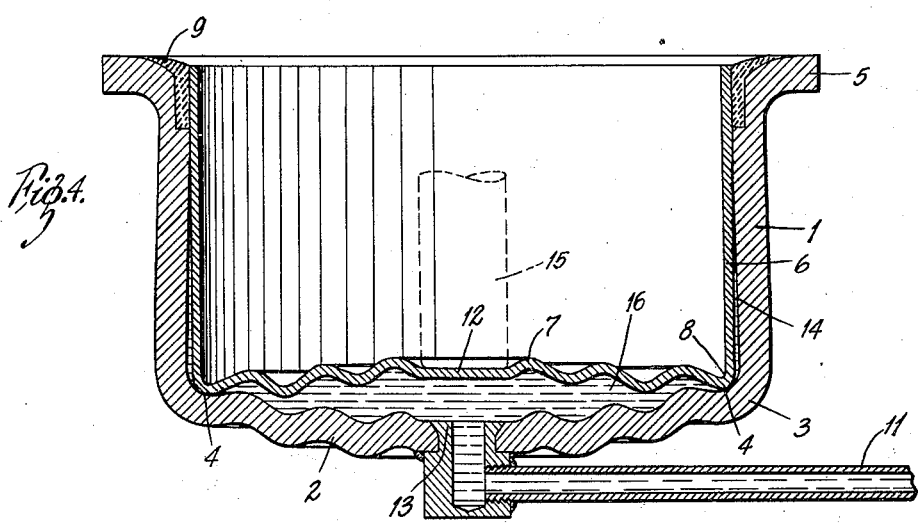
Figure 4 is a view similar to Figure 3 illustrating the action of this device under increase of temperature.

The complete thermostatic unit comprises a bulb 10, which may be of any suitable form but is illustrated in Figures 1 and 2 as an elongated, hollow cylinder or tube closed at its outer end and connected at its other end to a capillary tube 11, which establishes communication between the bulb 10 and the space 16 between the cup and the diaphragm. An expansible fluid, having a high rate of thermal expansion, is contained in the bulb 10, the capillary 11 and the space 16. When this unit is in use, the bulb 10 is located in the zone whose temperature is to be regulated, such as an oven or other heating device. The control unit is located at the place at or near the fuel valve, and the capillary 11 extends between the two. When the expansible fluid is heated by heating of the bulb 10, its volume increases and, since the volume of the bulb 10 does not increase at an equal rate, a portion of the fluid flows through the capillary 11 and into the space 16. This causes a corresponding increase in the volume of the space 16, such increase being accomplished by movement of the diaphragm disk 7 to a position such as indicated by contrast of Figure 3 with Figure 4. This movement may be utilized to actuate any suitable kind of control element, such for instance as a stem indicated at 15, bearing upon a flat spot 12 at the center of the disk 7. The stem 15 in turn, through the medium of an adjusting mechanism, actuates a fuel valve.

In the manufacture of the control element of the present invention, the diaphragm cup and the supporting cup may be formed by drawing or otherwise to dimensions such that the side walls thereof have a press fit with each other, and such that the bottom walls thereof nest snugly as shown fragmentarily in Figure 5. The bottoms of the respective cups may be corrugated separately or concurrently, but for close matching it is desirable to corrugate them concurrently. In order to connect the interior and exterior cups together so that the side walls thereof will be under initial tension in accordance with the present invention, the interior cup is forced down firmly into the exterior cup, so as to press the fillet 8 of the interior cup into close contact with the bend 4 of the exterior cup. This may be done by any suitable form of apparatus. In the drawings, 17 represents any suitable form of support or die; 18 represents a pressure plate; and 180 represents a suitable ram. It will be observed that the central area of the support 17, as well as the central area of the pressure plate 18, is relieved so as to restrict the pressure to the outer periphery of the bottom surfaces of the elements. The assembled elements are then heated as by means of any suitable type of hot blast, indicated at 19. The heating is carried out while maintaining pressure on the ram 180, so as to force the diaphragm element down into the cup, thus establishing a fixed relation between these elements at the lower extremities of their cylindrical walls. With this fixed relation established, the relative axial shift between the two walls may take place at all other points, being a maximum of course at the upper rims of the two walls. When all parts have obtained the same temperature, the end walls being pressed into firm contact with each other, are secured together by soldering, welding or otherwise at 9. The clamped relation is maintained until the connection 9 sets.

It will be seen that by this method the two walls are secured together at their upper rims while in their expanded condition. The heating to produce this expansion should be carried higher than the highest temperature to which the device is likely to be subjected in service. When the rims of the wall have been secured together, the entire unit is cooled to normal temperature in any suitable manner. Figure 7 shows the connected parts after cooling. During this cooling, however, the wall 1 of the brass cup now shrinks to a greater extent than the wall 6 of the diaphragm element. Since, however, the relative positions of these walls are now fixed at both top and bottom, the result of this shrinkage will be to set up opposing stresses in the two walls 1 and 6. It will be clear that the shrinkage of the wall 1 will put the wall 6 under compression while the resistance to such shrinkage by the wall 6 will put the wall 1 under tension. The fillet 8 at the bottom rim of the diaphragm element will now be pressed firmly into the corner 4 of the cup, and this pressure will be maintained at all temperatures below that at which the upper rims were secured together. Accordingly, relative axial movement between the diaphragm disk 7 and the bottom 2 of the cup, due solely to relative expansion of these parts will be eliminated until a temperature is reached at which the initial tension is overcome. Thereafter, further increase in ambient temperature will effect an increase in end clearance between corners 8 and 4.

In order to vary the temperature at which the initial tension in the side walls of the cup and the diaphragm is overcome, and hence to adjust the temperature at which relative expansion of the parts operates to increase the end clearance between them, the connected assembly may be operated upon in a manner such as to partially relieve the stresses; as for example, by mechanical shock, by annealing or by working, such as ironing or rolling. The degree to which such stress relieving treatment is applied will depend in any given case upon the temperature selected as the datum at which the initial tension is overcome, and consequently is arrived at by trial for each set of conditions; but once determined, may be readily duplicated. Particularly advantageous results have been achieved by partially relieving such internal stresses by mechanical shock, as for example by placing the assembled and connected cup and diaphragm upon a suitable table and striking the bottom surface of the cup with a blow, the force of which is predetermined by trial and test.

It will be seen therefore that this invention accomplishes the result of controlling the accuracy of the performance of a thermostatic unit of the character here involved, and that this is accomplished by the method, above described, in which the units are assembled together and then heated to a high temperature before their upper rims are secured together. Accordingly, upon cooling, the supporting cup is shrunk upon the diaphragm element so as to set up opposing shrinkage stresses in the walls of the two elements. The method provides, however, ways of relieving these stresses to any desired extent, so that the range of operation through which these stresses are active may be adjusted to suit special circumstances.

The various changes in the details of construction or procedure will occur to those skilled in the art upon reading the above description, and it is understood, of course, that such changes in details may be made within the scope of the appended claims without departing from the spirit of this invention, and accordingly the invention is not limited to the specific details shown and described.

Having thus described the invention, what is claimed is:

1. In the art of making thermostatic units of the character described the method comprising, providing a cup shaped support element, providing a similarly cup shaped diaphragm element, said elements having different coefficients of thermal expansion, nesting the elements so that they are in engagement at the turn between the side walls and the bottoms thereof, connecting the elements together at their upper rims, and shrinking the element having the greater coefficient of thermal expansion to increase the pressure between the parts at the turn and place the side walls of the elements under mutually opposed, axially directed stresses at atmospheric temperatures.

2. In the art of making thermostatic units of the character described the method comprising, providing a cup shaped support element, providing a similarly cup shaped diaphragm element, said elements having different coefficients of thermal expansion, nesting the elements so that they are in engagement at the turn between the side walls and the bottoms thereof, thermally expanding the side walls of the element having the greater coefficient of thermal expansion, maintaining the nested elements in engagement at the turn and while so expanded and maintained connecting the elements together at their upper rims, and thereafter cooling the assembled elements whereby to establish mutually opposed, axially directed stresses in the side walls of the elements.

3. In the art of making thermostatic units of the character described the method comprising, providing a cup shaped support element, providing a similarly cup shaped diaphragm element, said elements having different coefficients of thermal expansion, nesting the elements so that they are in engagement at the turn between the side walls and the bottoms thereof, thermally expanding the side walls of the element having the greater coefficient of thermal expansion, maintaining the nested elements in engagement at the turn and while so expanded and maintained connecting the elements together at their upper rims, and thereafter cooling the assembled elements whereby to establish mutually opposed, axially directed stresses in the side walls of the elements, the walls of the element having the higher coefficient of thermal expansion being placed in tension and the walls of the other element in compression.

4. In the art of making thermostatic units of the character described the method comprising, providing a cup shaped support element, providing a similarly cup shaped diaphragm element, said support element having a higher coefficient of thermal expansion than the diaphragm element, nesting the diaphragm element within the support element with the exterior of the diaphragm element in engagement at the turn with the interior of the support element, maintaining the nested elements in engagement at the turn and connecting the elements together at their upper rims while so maintained, thermally shrinking the support element upon the diaphragm element so as to establish mutually opposed, axially directed stresses in said members at atmospheric temperatures, and thereafter relieving such stresses.

5. In the art of making thermostatic units of the character described the method comprising, providing a cup shaped support element, providing a similarly cup shaped diaphragm element, said support element having a higher coefficient of thermal expansion than the diaphragm element, nesting the diaphragm element within the support element with the exterior of the diaphragm element in engagement at the turn with the interior of the support element, connecting the elements together at their upper rims, thermally shrinking the support element upon the diaphragm element so as to establish mutually opposed, axially directed stresses in said members at atmospheric temperatures, and thereafter working said assembled elements to relieve such stresses.

6. In the art of making thermostatic units of the character described the method comprising, providing a cup shaped support element, providing a similarly cup shaped diaphragm element, said support element having a higher coefficient of thermal expansion than the diaphragm element, nesting the diaphragm element within the support element with the exterior of the diaphragm element in engagement at the turn with the interior of the support element, connecting the elements together at their upper rims, thermally shrinking the support element upon the diaphragm element so as to establish mutually opposed, axially directed stresses in said members at atmospheric temperatures, and thereafter annealing said assembled elements to relieve such stresses.

LAWRENCE M. PERSONS.